(12) United States Patent
Murata et al.

(10) Patent No.: US 11,913,088 B2
(45) Date of Patent: Feb. 27, 2024

(54) HIGH-STRENGTH STEEL SHEET AND METHOD FOR PRODUCING SAME

(71) Applicant: Kabushiki Kaisha Kobe Seiko Sho (Kobe Steel, Ltd.), Kobe (JP)

(72) Inventors: Tadao Murata, Kakogawa (JP); Muneaki Ikeda, Kakogawa (JP); Toshio Murakami, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 0 days.

(21) Appl. No.: 17/760,969

(22) PCT Filed: Sep. 14, 2020

(86) PCT No.: PCT/JP2020/034736
§ 371 (c)(1),
(2) Date: Mar. 16, 2022

(87) PCT Pub. No.: WO2021/054290
PCT Pub. Date: Mar. 25, 2021

(65) Prior Publication Data
US 2022/0349020 A1   Nov. 3, 2022

(30) Foreign Application Priority Data
Sep. 17, 2019   (JP) .................... 2019-168392

(51) Int. Cl.
*C21D 9/46*       (2006.01)
*B32B 15/01*     (2006.01)
(Continued)

(52) U.S. Cl.
CPC ............ *C21D 9/46* (2013.01); *B32B 15/013* (2013.01); *C21D 6/005* (2013.01); *C21D 6/008* (2013.01);
(Continued)

(58) Field of Classification Search
None
See application file for complete search history.

(56) References Cited

U.S. PATENT DOCUMENTS

2012/0312433 A1* 12/2012 Mizuta ................. C22C 38/002
                                                                        420/128
2013/0330226 A1* 12/2013 Murakami ............. C22C 38/16
                                                                        420/83
(Continued)

FOREIGN PATENT DOCUMENTS

EP    3 394 299 A1   10/2018
EP    3 868 909 A1   8/2021
(Continued)

OTHER PUBLICATIONS

International Search Report dated Nov. 24.020 in PCT/JP2020/034736 filed on Sep. 14, 2020 (3 pages).
(Continued)

*Primary Examiner* — Seth Dumbris
(74) *Attorney, Agent, or Firm* — Oblon, McClelland, Maier & Neustadt, L.L.P.

(57) ABSTRACT

The present invention provides a high-strength steel sheet, which can be used in various applications including automobile parts and exhibits excellent collision safety and excellent moldability, and a method for manufacturing the high-strength steel sheet. The high-strength steel sheet according to an aspect of the present invention satisfies a predetermined chemical composition and has a metallographic microstructure having ferrite fraction: 0% to 10%, MA fraction: 0% to 30%, hard phase other than ferrite and MA: 70% to 100% in terms of area proportion and retained austenite fraction: 5% to 30% in terms of volume proportion, and in the high-strength steel sheet, the skewness of IQ as analyzed by the EBRD method is −1.2 to −0.3 when the skewness is expressed by a predetermined relational expres- (Continued)

sion in a case where crystal grains having a bcc structure and a bct structure are regarded as an aggregation of regions having an area of 0.05 μm².

20 Claims, 1 Drawing Sheet

(51) Int. Cl.
    *C21D 6/00*     (2006.01)
    *C21D 8/02*     (2006.01)
    *C22C 38/00*     (2006.01)
    *C22C 38/02*     (2006.01)
    *C22C 38/04*     (2006.01)
    *C22C 38/06*     (2006.01)
    *C22C 38/14*     (2006.01)
    *C23C 2/40*     (2006.01)

(52) U.S. Cl.
    CPC ......... *C21D 8/0205* (2013.01); *C21D 8/0226* (2013.01); *C21D 8/0263* (2013.01); *C22C 38/002* (2013.01); *C22C 38/02* (2013.01); *C22C 38/04* (2013.01); *C22C 38/06* (2013.01); *C22C 38/14* (2013.01); *C23C 2/40* (2013.01); *C21D 2211/001* (2013.01); *C21D 2211/005* (2013.01); *C21D 2211/008* (2013.01)

(56) References Cited

U.S. PATENT DOCUMENTS

| | | | |
|---|---|---|---|
| 2015/0000796 A1* | 1/2015 | Kakiuchi | C22C 38/16 |
| | | | 148/504 |
| 2015/0098857 A1 | 4/2015 | Kawano et al. | |
| 2018/0037964 A1* | 2/2018 | Murata | C21D 9/46 |
| 2019/0003007 A1 | 1/2019 | Venkatasurya et al. | |
| 2020/0024709 A1* | 1/2020 | Yokoyama | C21D 1/19 |
| 2020/0157647 A1 | 5/2020 | Ono et al. | |
| 2021/0381077 A1 | 12/2021 | Kohsaka et al. | |

FOREIGN PATENT DOCUMENTS

| | | | | |
|---|---|---|---|---|
| JP | 5589893 B2 | 9/2014 | | |
| WO | WO 2017/138504 A1 | 8/2017 | | |
| WO | WO 2017/169837 A1 | 10/2017 | | |
| WO | WO 2017/208759 A1 | 12/2017 | | |
| WO | WO 2018/190416 A1 | 10/2018 | | |
| WO | WO-2020080339 A1 * | 4/2020 | | C21D 1/19 |

OTHER PUBLICATIONS

Extended European Search Report dated Jun. 14, 2022 in European Application No. 20865435.0, 11 pages.

\* cited by examiner

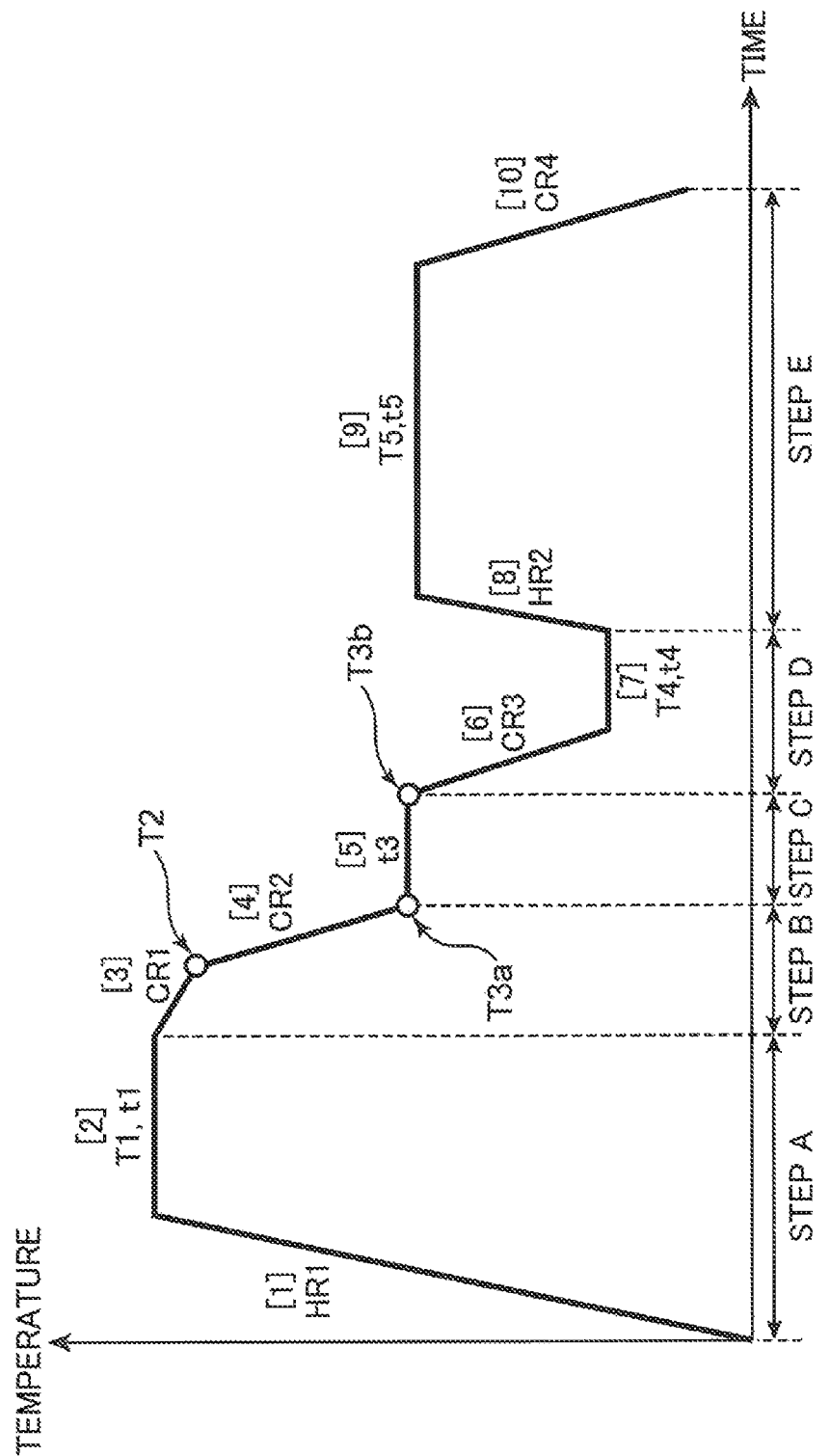

HIGH-STRENGTH STEEL SHEET AND METHOD FOR PRODUCING SAME

TECHNICAL FIELD

The present invention relates to a high-strength steel sheet that is applied to various applications including automobile parts.

BACKGROUND ART

Steel sheets used in automobile parts and the like are required to have improved strength in order to secure collision safety for passenger protection and to save the weight of the vehicle body for fuel efficiency improvement to reduce the environmental burden. Mechanical properties greatly affecting collision safety include, for example, tensile strength and yield strength.

On the other hand, in order to apply steel sheets as members for parts having complicated shapes, excellent moldability is also required. Mechanical properties greatly contributing to moldability include, for example, ductility, hole expansion property, and bendability. However, it is difficult to improve both collision safety and moldability at the same time.

So far, techniques for improving collision safety or techniques for improving moldability have been each proposed as separate techniques (Patent Literatures 1 and 2). However, it is difficult to improve both collision safety and moldability at the same time even by these techniques proposed so far. It is considered that this is because it is necessary to increase the strength of the steel sheet (for example, to improve the tensile strength) as the requirement for improving collision safety but this requirement conflict with the requirement for improving the moldability (for example, ductility and hole expansion property).

From the viewpoint of protecting passengers in the event of a car collision, it is important to prevent the passengers from coming into contact with the vehicle body deformed by the collision. The present inventors have considered that it is possible to reduce the amount of deformation of the parts and suppress the contact of the vehicle body with the passenger in the event of a collision by increasing the load at the initial stage of deformation (load required for initial deformation) in the event of a collision. Based on this idea, the present inventors have studied high-strength steel sheets having a high load required for initial deformation from various perspectives in addition to moldability in various applications including automobile parts.

Specific examples of the required properties for high-strength steel sheets having features as described above include the following requirements (1) to (5).

(1) Tensile strength TS: 780 MPa or more
(2) Yield ratio YR expressed by proportion (YS/TS) of yield strength YS to tensile strength TS: 0.70 or more
(3) Tensile strength TS×total elongation EL: 13000 MPa·% or more
(4) Tensile strength TS×hole expansion ratio λ: 40000 MPa·% or more
(5) Load/sheet thickness wherein the load deforms test piece to bending angle of 10° in bending test by German Association of Automotive Industry (VDA): 3.0 kN/mm or more The present invention has been made in view of circumstances as described above, and an object thereof is to provide a high-strength steel sheet having required properties at high levels and both excellent collision safety and excellent moldability, as well as a useful method for manufacturing such a high-strength steel sheet.

CITATION LIST

Patent Literature

Patent Literature 1: JP 5,610,102 B2
Patent Literature 2: JP 5,589,893 B2

SUMMARY OF INVENTION

A high-strength steel sheet according to an aspect of the present invention contains
each of
C: 0.10% to 0.35%;
Si+Al: 0.5% to 3.0%;
Mn: 1.0% to 3.0%;
P: more than 0% and 0.05% or less;
S: more than 0% and 0.01% or less in terms of mass percentage; and
iron and unavoidable impurities as remainder,
wherein the high-strength steel sheet has a metallographic microstructure having ferrite fraction: 0% to 10%, MA fraction: 0% to 30%, hard phase other than ferrite and MA: 70% to 100% in terms of area proportion and
retained austenite fraction: 5% to 30% in terms of volume proportion, and
a skewness of IQ as analyzed by an EBSD method is −1.2 to −0.3 when the skewness is expressed by the following Formula (1) in a case where crystal grains having a bcc structure and a bct structure are regarded as an aggregation of regions having an area of 0.05 μm².

[Math. 2]

$$\frac{n}{(n-1)(n-2)}\sum\left(\frac{x_i - x_{ave}}{s}\right)^3 \qquad \text{Formula (1)}$$

Each variable in Formula (1) denotes the following.
n: Total number of regions having a bcc structure and a bct structure and an area of 0.05 μm²
s: Standard deviation of IQ in a region having an area of 0.05 μm²
$x_i$: IQ of a region i having an area of 0.05 μm²
$x_{ave}$: Average IQ of regions having a bcc structure and a bct structure and an area of 0.05 μm²

As another aspect of the present invention, a method for manufacturing a high-strength steel sheet is also included, and this manufacturing method is a method for manufacturing a high-strength steel sheet as described above, and the method includes, in this order:
after heating a steel material having the above chemical composition, then subjecting the steel material to hot rolling, cooling and coiling the steel material after the hot rolling is completed, and then subjecting the steel material to pickling and cold rolling,
a step of heating the steel material to a temperature T1 of an Ac₃ transformation point of the steel or more and 950° C. or less and holding the steel material for a time t1 of 5 seconds or more and 1800 seconds or less in this temperature range for austenitization;
a step of performing cooling from a rapid cooling start temperature T2 of 700° C. or more to a cooling stop temperature T3a in a temperature range of 300° C. or more and 500° C. or less at an average cooling rate CR2 of 10° C./sec or more;

a step of performing retention for a time t3 of 10 seconds or more and less than 300 seconds at an average cooling rate of 10° C./sec or less in a temperature range of 300° C. or more and 500° C. or less;

a step of performing cooling from a retention end temperature T3b of 300° C. or more to a cooling stop temperature T4 in a temperature range of 100° C. or more and 300° C. or less at an average cooling rate CR3 of 10° C./sec or more; and a step of performing heating from the cooling stop temperature T4 to a reheating temperature T5 that satisfies the following requirement in a temperature range of 300° C. or more and 500° C. or less and performing holding for a time t5 of 350 seconds or more and 1800 seconds or less in the temperature range of the reheating temperature T5, a difference between the reheating temperature T5 and an average temperature of the cooling stop temperature T3a and the retention end temperature T3b being 50° C. or less.

The objects, features and advantages of the present invention will be apparent from the following detailed description and accompanying drawings.

BRIEF DESCRIPTION OF DRAWINGS

FIG. 1 is a schematic diagram illustrating an example of a heat treatment pattern performed on an original sheet.

DESCRIPTION OF EMBODIMENTS

The present inventors have diligently studied the microstructure for realizing a high-strength steel sheet exhibiting both excellent collision safety and excellent moldability. As a result, it has been found out that a high-strength steel sheet exhibiting both excellent collision safety and excellent moldability can be obtained by appropriately prescribing the distribution state of IQ as analyzed by the EBSD method for relatively soft bainitic ferrite and bainite and hard fresh martensite and tempered martensite which are the main microstructures having a bcc structure and a bct structure, in a case where the crystal grains are regarded as an aggregation of regions having an area of 0.05 $\mu m^2$, and the present invention has been thus completed.

According to the present invention, it is possible to provide a high-strength steel sheet exhibiting both excellent collision safety and excellent moldability and a useful method for manufacturing such a high-strength steel sheet.

[High-Strength Steel Sheet]

The reason why the chemical composition is prescribed in the high-strength steel sheet of the present embodiment is as follows. In the following chemical composition, "%" means "% by mass".

[C: 0.10 to 0.35%]

C is an element effective for obtaining a desired microstructure such as retained austenite and highly securing properties such as "tensile strength TS×total elongation EL". In order to exert these effects, the amount of C is required to be set to 0.10% or more. The amount of C is preferably 0.13% or more, more preferably 0.15% or more, still more preferably 0.18% or more. However, when the amount of C becomes excessive and exceeds 0.35%, MA (Martensite-Austenite constituent) and retained austenite become coarse, and both the deep drawing property and the hole expansion property evaluated by the hole expansion ratio λ decrease. When the amount of C is excessive, the weldability is also adversely affected. Therefore, the amount of C is required to be set to 0.35% or less, and is preferably 0.33% or less, more preferably 0.30% or less.

[Si+Al: 0.5 to 3.0%]

Both Si and Al have the action of suppressing the precipitation of cementite and promoting the formation of retained austenite. In order to effectively exert such an action, the total amount (Si+Al) of Si and Al is required to be set to 0.5% or more. Si+Al is preferably 0.7% or more, more preferably 1.0% or more. However, when Si+Al exceeds 3.0% and becomes excessive, tempered martensite and bainite cannot be secured, and MA and retained austenite become coarse. Therefore, Si+Al is required to be set to 3.0% or less. Si+Al is preferably 2.5% or less, more preferably 2.0% or less. Between Si and Al, Al may be added in an amount sufficient to function as a deoxidizing element, namely, at less than 0.1%. Alternatively, for the purpose of suppressing the formation of cementite and increasing the amount of retained austenite, for example, Al may be contained in a large amount of 0.6% or more.

[Mn: 1.0 to 3.0%]

Mn is an element necessary for suppressing the formation of ferrite and securing tempered martensite, bainite and the like other than ferrite. In order to effectively exert such actions, the amount of Mn is set to 1.0% or more. The amount of Mn is preferably 1.5% or more, more preferably 1.7% or more. However, when the amount of Mn becomes excessive and exceeds 3.0%, bainite transformation is suppressed during the manufacturing process, relatively soft bainite is not sufficiently obtained, and as a result, high total elongation EL cannot be secured. Therefore, the amount of Mn is required to be set to 3.0% or less, and is preferably 2.7% or less, more preferably 2.5% or less.

[P: More Than 0% and 0.05% Or Less]

P is an impurity that is unavoidably mixed in. When the amount of P becomes excessive and exceeds 0.05%, the total elongation EL and the hole expansion ratio λ decrease. Therefore, the amount of P is required to be set to 0.05% or less. The amount of P is preferably 0.03% or less. It is impossible to decrease the amount of P to 0% in industrial production, and P is contained at about 0.001% or more.

[S: More Than 0% and 0.01% Or Less]

S is an impurity that is unavoidably mixed in. When the amount of S becomes excessive and exceeds 0.01%, sulfide-based inclusions such as MnS are formed, and these inclusions become the starting point of cracking, and the hole expansion property decreases. Therefore, the amount of S is required to be set to 0.01% or less. The amount of S is preferably 0.005% or less. It is impossible to decrease the amount of S to 0% in industrial production, and S is contained at about 0.0005% or more.

The chemical composition prescribed in the high-strength steel sheet of the present embodiment is as described above, and the remainder is iron and unavoidable impurities other than P and S. As these unavoidable impurities, elements, for example, trace elements such as As, Sb, Sn introduced depending on the situations of raw materials, materials, manufacturing equipment and the like are allowed to be mixed. For example, there are elements, which are impurities of which the content is usually preferably smaller such as P and S described above, and of which the composition range is separately prescribed as follows. For this reason, the term "unavoidable impurities" constituting the remainder means the concept excluding the elements of which the composition range is separately prescribed. There is also N as an impurity, but the amount thereof is preferably as follows.

[N: 0.01% Or Less]

N is an impurity mixed in the steel, and when the amount of N becomes excessive, N forms a coarse nitride to deteriorates bendability and hole expansion property or become a cause of blow holes during welding. For this reason, it is more preferable as the amount of N is smaller as P and S, and the amount of N is preferably 0.01% or less. Decreasing the amount of N is costly, and the cost remarkably increases when it is attempted to decrease the amount of N to less than 0.0005%. For this reason, the lower limit of the amount of N is preferably set to 0.0005% or more.

As a preferred embodiment of the present invention, in addition to the above-mentioned elements, it is also effective to contain (a) at least one selected from the group consisting of Ti: more than 0% and 0.2% or less, Nb: more than 0% and 0.2% or less, and V: more than 0% and 0.5% or less, (b) at least one selected from the group consisting of Ni: more than 0% and 2% or less, Cr: more than 0% and 2% or less, and Mo: more than 0% and 0.5% or less, (c) B: more than 0% and 0.005% or less, (d) at least one selected from the group consisting of Mg: more than 0% and 0.04% or less, REM: more than 0% and 0.04% or less, and Ca: more than 0% and 0.04% or less, and the like in the high-strength steel sheet of the present embodiment, if necessary. The properties of the high-strength steel sheet are further improved depending on the kinds of elements contained.

[At Least One Selected From the Group Consisting of Ti: More Than 0% and 0.2% Or Less, Nb: More Than 0% and 0.2% Or Less, and V: More Than 0% and 0.5% Or Less]

Ti is an element that exerts the effects of precipitation strengthening and microstructure micronization, and contributes to the strength improvement of the steel sheet. Hence, Ti may be contained. These effects increase as the content of Ti increases, and the amount of Ti is preferably 0.01% or more, more preferably 0.02% or more in order to effectively exert the effects. However, when the amount of Ti exceeds 0.2% and becomes excessive, the carbonitride of Ti is excessively precipitated and the moldability of the steel sheet decreases. Hence, the amount of Ti is preferably 0.2% or less, more preferably 0.10% or less, still more preferably 0.06% or less.

As Ti, Nb is an element that exerts the effects of precipitation strengthening and microstructure micronization, and contributes to the strength improvement of the steel sheet. Hence, Nb may be contained. These effects increase as the content of Nb increases, and the amount of Nb is preferably 0.005% or more, more preferably 0.010% or more in order to effectively exert the effects. However, when the amount of Nb exceeds 0.2% and becomes excessive, the carbonitride of Nb is excessively precipitated and the moldability of the steel sheet decreases. Hence, the amount of Nb is preferably 0.2% or less, more preferably 0.10% or less, still more preferably 0.06% or less.

As Ti and Nb, V is an element that exerts the effects of precipitation strengthening and microstructure micronization, and contributes to the strength improvement of the steel sheet. Hence, V may be contained. These effects increase as the content of V increases, and the amount of V is preferably 0.01% or more, more preferably 0.02% or more in order to effectively exert the effects. However, when the amount of V exceeds 0.5% and becomes excessive, the carbonitride of V is excessively precipitated and the moldability of the steel sheet decreases. Hence, the amount of V is preferably 0.30% or less, more preferably 0.125% or less, still more preferably 0.10% or less.

Each of Ti, Nb and V may be contained singly, or two or three of Ti, Nb or V may be contained concurrently.

[At Least One Selected From the Group Consisting of Ni: More Than 0% and 2% Or Less, Cr: More Than 0% and 2% Or Less, and Mo: More Than 0% and 0.5% Or Less]

Ni is an effective element that contributes to the increase in strength of the steel sheet, stabilizes retained austenite, and secures a desired amount of retained austenite. Hence, Ni may be contained. These effects increase as the content of Ni increases, and the amount of Ni is preferably 0.001% or more, more preferably 0.01% or more in order to effectively exert the effects. However, when the amount of Ni exceeds 2% and becomes excessive, the manufacturability during hot rolling decreases. Hence, the amount of Ni is preferably 2% or less, more preferably 1.0% or less.

As Ni, Cr is an effective element that contributes to the increase in strength of the steel sheet, stabilizes retained austenite, and secures a desired amount of retained austenite. Hence, Cr may be contained. These effects increase as the content of Cr increases, and the amount of Cr is preferably 0.001% or more, more preferably 0.01% or more in order to effectively exert the effects. However, when the amount of Cr exceeds 2% and becomes excessive, the manufacturability during hot rolling decreases. Hence, the amount of Cr is preferably 2% or less, more preferably 1.0% or less.

As Ni and Cr, Mo is an effective element that contributes to the increase in strength of the steel sheet, stabilizes retained austenite, and secures a desired amount of retained austenite. Hence, Mo may be contained. These effects increase as the content of Mo increases, and the amount of Mo is preferably 0.001% or more, more preferably 0.01% or more in order to effectively exert the effects. However, when the amount of Mo exceeds 0.5% and becomes excessive, the manufacturability during hot rolling decreases. Hence, the amount of Mo is preferably 0.5% or less, more preferably 0.20% or less.

Each of Ni, Cr and Mo may be contained singly, or two or three of Ni, Cr or Mo may be contained concurrently.

[B: More Than 0% and 0.005% Or Less]

B is an element effective for suppressing ferrite transformation by enhancing hardenability. Hence, B may be contained. These effects increase as the content of B increases, and the amount of B is preferably 0.0001% or more, more preferably 0.0010% or more in order to effectively exert the effects. However, when the amount of B exceeds 0.005% and becomes excessive, the manufacturability during hot rolling decreases. Hence, the amount of B is preferably 0.005% or less, more preferably 0.0030% or less.

[At Least One Selected From the Group Consisting of Mg: More Than 0% and 0.04% Or Less, REM: More Than 0% and 0.04% Or Less, and Ca: More Than 0% and 0.04% Or Less]

Mg, REM (rare earth element) and Ca form fine oxides or sulfides, and suppress the decrease in hole expansion property due to coarse oxides or sulfides. Hence, Mg, REM or Ca may be contained in an arbitrary combination thereof. These effects increase as the contents of Mg, REM and Ca increase, and the amount of Mg, the amount of REM, and the amount of Ca are each preferably 0.0005% or more, more preferably 0.0010% or more in order to sufficiently obtain the effects. However, when the amount of Mg, the amount of REM, or the amount of Ca exceeds 0.04% and becomes excessive, the oxide or sulfide becomes coarse and the hole expansion property decreases. Hence, the amount of Mg, the amount of REM, and the amount of Ca are each preferably 0.04% or less, more preferably 0.010% or less. REM includes a total of 17 kinds of lanthanoid-series rare earth elements from La (atomic number 57) to Lu (atomic number 71) in addition to Sc and Y, and the amount of REM means the total amount of these 17 kinds of elements.

Next, the metallographic microstructure of the high-strength steel sheet of the present embodiment will be described. The area proportion and volume proportion below are the proportions occupying in the total metallographic microstructure, respectively.

[Ferrite Fraction: 0% to 10% By Area in Terms of Area Proportion]

Ferrite is generally excellent in workability, but has a problem of low strength. As a result, the yield ratio YR decreases when the amount of ferrite is large. For this reason, the ferrite fraction is set to 0% to 10% by area in terms of area proportion. The upper limit of the ferrite fraction is preferably 5% by area or less, more preferably 3% by area or less. The ferrite fraction can be determined by observing a nital etched steel sheet under a scanning electron microscope (SEM) and measuring the black portions containing no carbide by point counting.

[MA Fraction: 0% to 30% By Area in Terms of Area Proportion]

MA is a complex microstructure of fresh martensite and retained austenite. Since MA contains retained austenite, increasing the amount of MA is effective in improving the workability indicated by the total elongation EL. However, MA also contains extremely hard fresh martensite, and thus the hole expansion ratio decreases as the MA fraction increases. For this reason, the MA fraction is set to 0% to 30% by area in terms of area proportion. The lower limit of the MA fraction is preferably 3% by area or more, more preferably 5% by area or more. The upper limit of the MA fraction is preferably 25% by area or less, more preferably 20% by area or less. The MA fraction can be determined by observing a nital etched steel sheet under SEM and measuring the gray portions containing no carbide by point counting.

[Hard Phase Other Than Ferrite and MA: 70% to 100% By Area in Terms of Area Proportion]

The hard phase is an important microstructure for securing the desired tensile strength TS and yield ratio YR. The high-strength steel sheet of the present embodiment may contain, for example, bainitic ferrite, bainite, tempered martensite, fresh martensite and the like as the hard phase. In the high-strength steel sheet of the present embodiment, the area proportion of the hard phase other than ferrite and MA is set to 70% to 100% by area in order to secure the desired tensile strength TS and yield ratio YR. The area proportion of the hard phase other than ferrite and MA is preferably 75% by area or more, more preferably 80% by area or more. The area proportion of the hard phase other than ferrite and MA can be determined as the area proportion of the portions excluding the above-mentioned ferrite and MA.

[Retained Austenite Fraction: 5% to 30% By Volume in Terms of Volume Proportion]

Retained austenite undergoes a TRIP (transformation induced plasticity) phenomenon to be transformed into martensite in press working or the like, and can provide a large total elongation EL. Formed martensite has a high hardness and thus can increase the tensile strength TS×total elongation EL (hereinafter, may be abbreviated as TS×EL). Since the yield ratio of retained austenite is low, it is necessary to prevent excessive introduction of retained austenite in order to secure the desired high yield ratio. For this reason, the volume proportion of retained austenite is set to 5% to 30% by volume. The retained austenite fraction is preferably 7% by volume or more and 20% by volume or less.

The retained austenite fraction can be measured, for example, by X-ray diffraction. In this method, for example, a portion from the surface of the steel sheet to ¼ of the thickness of the steel sheet can be removed by mechanical polishing and chemical polishing, and Co·Kα rays can be used as characteristic X-rays. Then, the volume fraction of retained austenite can be determined from the integrated intensity ratio of the diffraction peaks attributed to the body-centered cubic lattice (bcc) phase and the body centered tetragonal lattice (bct) and face-centered cubic lattice (fcc).

[Skewness of IQ as Analyzed By EBSD Method is −1.2 to −0.3 when Skewness is Expressed By Following Formula (1) in Case where Crystal Grains Having bcc Structure and bct Structure are Set as Aggregation of Regions Having Area of 0.05 μm²]

[Math. 3]

$$\frac{n}{(n-1)(n-2)}\sum\left(\frac{x_i - x_{ave}}{s}\right)^3 \qquad \text{Formula (1)}$$

Each variable in Formula (1) denotes the following.

n: Total number of regions having a bcc structure and a bct structure and an area of 0.05 μm² s: Standard deviation of IQ in a region having an area of 0.05 μm²

$x_i$: IQ of a region i having an area of 0.05 μm²

$x_{ave}$: Average IQ of regions having a bcc structure and a bct structure and an area of 0.05 μm²

Formula (1) is a parametric equation analyzed and defined based on the experimental results.

In the high-strength steel sheet of the present embodiment, metallographic microstructures having a bcc structure and a bct structure such as bainitic ferrite, bainite and tempered martensite are greatly similar to one another, and it is difficult to unambiguously define the metallographic microstructures. For this reason, the EBSD (Electron Back Scatter Diffraction patterns) method, which is a crystal analysis method using SEM, is used to analyze IQ (Image Quality) of crystal grains having a bcc structure and a bct structure.

IQ indicates the sharpness of the EBSD pattern and is generally known to be affected by the amount of dislocation in the crystal. Specifically, more dislocations tend to be present in the crystal as the IQ is smaller. In the high-strength steel sheet of the present embodiment, as IQ, the IQ at each measurement point is not adopted, but the region surrounded by the boundary where the crystal orientation difference between the measurement points is 3° or more is defined as a crystal grain and the average IQ for every crystal grain having a bcc structure and a bct structure is adopted.

In the IQ analysis, the measurement point with CI<0.1 is considered unreliable and is excluded from the analysis. The CI (Confidence Index) is an index showing how well the EBSD pattern detected at each measurement point matches the database of the specified crystal system (bcc or fcc in the case of iron), and indicates the reliability of data.

Relatively soft bainitic ferrite and bainite and hard fresh martensite and tempered martensite are the major microstructures having a bcc structure and a bct structure. Formula (1) expresses the skewness of IQ as analyzed by the EBSD method in a case where crystal grains having a bcc structure and a bct structure are regarded as an aggregation of regions having the same IQ as the crystal grains and having an area of 0.05 μm². According to Formula (1), the relation between area and IQ can be clarified for bainitic ferrite and bainite and for fresh martensite and tempered martensite.

The area of crystal grains is not always an integral multiple of 0.05 μm². For this reason, the value obtained by dividing the area of the crystal grains by 0.05 μm² and rounding off the first decimal place is regarded as the number of regions having an area of 0.05 μm², which are contained in the crystal grains. As a result of the study by the present inventors, it has been revealed that both excellent collision safety and excellent moldability can be achieved by controlling the skewness of IQ calculated by Formula (1) to −1.2 to −0.3 for the aggregation of regions having an area of 0.05 μm² in the crystal grains having a bcc structure and a bct structure.

All of the reasons why the high-strength steel sheet of the present embodiment exhibits excellent collision safety and excellent moldability have not been clarified, but may be considered as follows. Namely, it is presumed that it is possible to suppress the concentration of strain on the soft microstructure at the initial stage of deformation while utilizing the effect of improving the moldability by the soft microstructure in a composite microstructure steel sheet with microstructures having different hardness by properly controlling the area of the microstructure having a bcc structure and a bct structure and the state of IQ distribution.

When the skewness of IQ is less than −1.2, this means that the proportion of soft microstructures having high IQ is high and the average IQ is relatively high compared to the desired distribution state. At this time, as the soft microstructures increase, the load at the bending angle of 10° in the VDA bending test/sheet thickness decreases, and the desired collision safety cannot be obtained. As the difference in hardness between microstructures is large and the places that become the starting point of cracking in the hole expansion test increase, tensile strength TS×hole expansion ratio λ (hereinafter, may be abbreviated as TS×λ) of 40000 MPa·% or more cannot be secured.

When the skewness of IQ exceeds −0.3, this indicates that the proportion of hard microstructures having relatively low IQ is high compared to the desired distribution state. At this time, as the proportion of the soft microstructures decreases, the moldability, particularly the total elongation EL, decreases and the desired TS×EL cannot be obtained.

In the high-strength steel sheet of the present embodiment, the properties such as (1) tensile strength TS, (2) yield ratio YR, (3) TS×EL, (4) TS×λ, and (5) Load/sheet thickness wherein the load deforms test piece to bending angle of 10° in bending test by German Association of Automotive Industry (VDA) are all at high levels. Next, these properties of the high-strength steel sheet of the present embodiment will be described.

(1) Tensile Strength TS: 780 MPa Or More

The high-strength steel sheet of the present embodiment preferably has a tensile strength TS of 780 MPa or more. The tensile strength TS is more preferably 880 MPa or more, still more preferably 980 MPa or more. It is more preferable as the tensile strength TS is higher, but the upper limit of the tensile strength TS is about 1600 MPa or less considering the chemical composition and the manufacturing conditions of the high-strength steel sheet of the present embodiment.

(2) Yield Ratio YR: 0.70 Or More

In the high-strength steel sheet of the present embodiment, the yield ratio YR expressed by the proportion (YS/TS) of the yield strength YS to the tensile strength TS is preferably 0.70 or more. This makes it possible to realize a high yield strength in combination with the above-mentioned high tensile strength TS. As a result, it is possible to suppress deformation when a load is applied and improve collision safety. The yield ratio YR is more preferably 0.75 or more, still more preferably 0.80 or more. From the viewpoint of collision safety, it is more preferable as the yield ratio YR is higher, but the upper limit of the yield ratio YR is generally 0.95 or less considering the chemical composition and the manufacturing conditions of the high-strength steel sheet of the present embodiment.

(3) TS×EL: 13000 MPa·% Or More

The high-strength steel sheet of the present embodiment preferably has TS×EL of 13000 MPa·% or more. By having TS×EL of 13000 MPa·% or more, it is possible to achieve both excellent strength and excellent press moldability. TS×EL is more preferably 14000 MPa·% or more, still more preferably 15000 MPa·% or more. It is more preferable as TS×EL is higher, but the upper limit of TS×EL is about 25000 MPa·% or less considering the chemical composition and the manufacturing conditions of the high-strength steel sheet of the present embodiment.

(4) TS×λ: 40000 MPa·% Or More

The high-strength steel sheet of the present embodiment preferably has TS×λ of 40000 MPa·% or more. By having TS×λ of 40000 MPa·% or more, it is possible to achieve both excellent strength and excellent press moldability. TS×λ is more preferably 50000 MPa·% or more, still more preferably 60000 MPa·% or more. It is more preferable as TS×λ is higher, but the upper limit of TS×λ is about 150000 MPa·% or less considering the chemical composition and the manufacturing conditions of the high-strength steel sheet of the present embodiment.

(5) Load/Sheet Thickness Wherein the Load Deforms Test Piece to Bending Angle of 10° in Bending Test By German Association of Automotive Industry (VDA): 3.0 kN/mm Or More In the high-strength steel sheet of the present embodiment, the value of load/sheet thickness wherein the load deforms the test piece to a bending angle of 10° in the bending test of VDA is preferably 3.0 kN/mm or more. As the value of load/sheet thickness wherein the load deforms the test piece to a bending angle of 10° in the bending test of VDA is preferably 3.0 kN/mm or more, it is possible to decrease the amount of deformation of the steel sheet in a collision or the like and improve collision safety. The value of load/sheet thickness is more preferably 3.1 kN/mm or more, still more preferably 3.2 kN/mm or more. It is more preferable as the value of load/sheet thickness is higher, but the upper limit of the value of load/sheet thickness wherein the load deforms the test piece to a bending angle of 10° in the bending test of VDA is about 5.0 kN/mm or less considering the chemical composition and the manufacturing conditions of the high-strength steel sheet of the present embodiment.

[Manufacturing Method]

The high-strength steel sheet of the present embodiment can be manufactured by following the procedure described below. The present inventors have found out that a high-strength steel sheet having the desired steel microstructure described above, and as a result, having the above-mentioned desired mechanical properties can be obtained by performing the heat treatment to be described in detail below on the original sheet having a predetermined chemical composition.

Examples of the original sheet to be subjected to a heat treatment include a hot rolled steel sheet obtained by hot rolling a steel material, and a cold rolled steel sheet obtained by further pickling and cold rolling the hot rolled steel sheet, and the conditions for hot rolling, pickling, and cold rolling are not particularly limited.

An example of a heat treatment pattern performed on an original sheet is schematically illustrated in FIG. 1.

[Step A: Step of Heating Steel Sheet to Temperature T1 of $Ac_3$ Transformation Point Or More and 950° C. Or Less and Holding Steel Sheet for Time t1 of 5 Seconds Or More and 1800 Seconds Or Less in This Temperature Range for Austenitization]

In step A in FIG. 1, the steel sheet is heated to a temperature T1 (heating temperature T1) of the $Ac_3$ transformation point or more and 950° C. or less and held for a time t1 (holding time t1) of 5 seconds or more and 1800 seconds or less in the temperature range. This makes it possible to sufficiently reverse transform the steel sheet microstructure into austenite.

The average heating rate HR1 ([1] in FIG. 1) when the steel sheet is heated to the heating temperature T1 of the $Ac_3$ transformation point or more and 950° C. or less is not particularly limited, and the steel sheet may be heated at an arbitrary average heating rate HR1. For example, the steel sheet may be heated from room temperature to the heating temperature T1 by setting the average heating rate HR1 to 1° C./sec or more and 100° C./sec or less.

When the heating temperature T1 ([2] in FIG. 1) is less than the $Ac_3$ transformation point, the reverse transformation to austenite becomes insufficient, ferrite remains, and thus the yield ratio YR decreases. Hence, the heating temperature T1 is preferably set to the $Ac_3$ transformation point or more, and is preferably the $Ac_3$ transformation point+5° C. or more, more preferably the $Ac_3$ transformation point+10° C. or more. When the heating temperature T1 exceeds 950° C., the crystal grains of the steel sheet microstructure may become coarse and the hole expansion ratio λ may decrease, and thus the heating temperature T1 is preferably 950° C. or less.

When the holding time t1 at the heating temperature T1 ([2] in FIG. 1) is less than 5 seconds, the reverse transformation to austenite becomes insufficient, ferrite remains, and thus the yield ratio YR decreases. Hence, the holding time t1 is preferably set to 5 seconds or more, and is preferably 10 seconds or more, more preferably 20 seconds or more.

When the holding time t1 is more than 1800 seconds, in addition to the decrease in productivity, the crystal grains of the steel sheet microstructure may become coarse and thus a decrease in steel sheet properties such as the hole expansion ratio λ may occur. Hence, the holding time t1 is preferably set to 1800 seconds or less, and is preferably 1500 seconds or less, more preferably 1000 seconds or less.

[Step B: Step of Performing Cooling From Rapid Cooling Start Temperature T2 of 700° C. Or More to Cooling Stop Temperature T3a in Temperature Range of 300° C. Or More and 500° C. Or Less at Average Cooling Rate of 10° C./Sec Or More]

In step B in FIG. 1, the steel sheet, which has been heated and held in step A, is cooled from the rapid cooling start temperature T2 of 700° C. or more to the cooling stop temperature T3a of 300° C. or more and 500° C. or less at an average cooling rate of 10° C./sec or more. This makes it possible to suppress the precipitation of ferrite during the cooling process.

In the manufacturing method of the present embodiment, the average cooling rate CR1 ([3] in FIG. 1) from the heating temperature T1 to the rapid cooling start temperature T2 is not particularly limited. Examples of the average cooling rate CR1 include cooling at 0.1° C./sec or more and 5° C./sec or less.

When the rapid cooling start temperature T2 is less than 700° C., ferrite precipitates and the yield ratio YR decreases. Hence, the rapid cooling start temperature T2 is preferably set to 700° C. or more, and is preferably 750° C. or more, more preferably 800° C. or more. The upper limit of the rapid cooling start temperature T2 is not particularly limited, and may be the heating temperature T1 in step A or less.

When the average cooling rate CR2 ([4] in FIG. 1) from the rapid cooling start temperature T2 to the cooling stop temperature T3a is less than 10° C./sec, ferrite precipitates during cooling and the yield ratio YR decreases. Hence, the average cooling rate CR2 is preferably set to 10° C./sec or more, and is preferably 15° C./sec or more, more preferably 20° C./sec or more. The upper limit of the average cooling rate CR2 is not particularly limited, but may be, for example, 100° C./sec or less.

The cooling stop temperature T3a is a temperature at which the rapid cooling ends, and is also a retention start temperature in step C to be described later. When this cooling stop temperature T3a is less than 300° C., bainite to be precipitated in the subsequent step becomes excessively hard as well as the formation of the carbon concentrated portion does not proceed sufficiently, the amount of retained austenite also decreases, and the desired TS×EL cannot be obtained. Hence, the cooling stop temperature T3a is preferably set to 300° C. or more, and is preferably 320° C. or more, more preferably 340° C. or more.

When the cooling stop temperature T3a exceeds 500° C., bainite to be precipitated in the subsequent step becomes excessively soft and the desired yield ratio YR cannot be obtained. As the carbon concentrated portion becomes coarse, coarse retained austenite and MA are formed and TS×λ also decreases. Hence, the cooling stop temperature T3a is preferably set to 500° C. or less, and is preferably 480° C. or less, more preferably 460° C. or less.

[Step C: Step of Performing Retention for Time t3 of 10 Seconds Or More and Less Than 300 Seconds at Average Cooling Rate of 10° C./Sec Or Less in Temperature Range of 300° C. Or More and 500° C. Or Less]

In step C in FIG. 1, the steel sheet cooled in step B is retained for a time t3 (retention time t3: [5] in FIG. 1) of 10 seconds or more and less than 300 seconds at an average cooling rate of 10° C./sec or less in a temperature range of 300° C. or more and 500° C. or less. This partially forms bainite. This bainite has a lower solid solution limit of carbon than austenite and thus expels carbon exceeding the solid solution limit. As a result, a carbon concentrated austenite region is formed around bainite. This region becomes retained austenite after cooling in step D and reheating in step E, which will be described later. This retained austenite can enhance TS×EL.

When the temperature (retention temperature) at the time of retention in this step C is less than 300° C., bainite to be precipitated becomes excessively hard as well as the formation of the carbon concentrated portion does not proceed sufficiently, the amount of retained austenite also decreases, and the desired TS×EL cannot be obtained as described above. Hence, the retention temperature is preferably set to 300° C. or more, and is preferably 320° C. or more, more preferably 340° C. or more.

When the retention temperature exceeds 500° C., bainite to be precipitated becomes excessively soft and the desired yield ratio YR cannot be obtained. As the carbon concentrated portion becomes coarse, coarse retained austenite and MA are formed and TS×λ, also decreases. Hence, the retention temperature is preferably set to 500° C. or less, and is preferably 480° C. or less, more preferably 460° C. or less.

When the average cooling rate in step C exceeds 10° C./sec, sufficient bainite transformation does not occur, as a result, sufficient carbon concentrated regions are not formed, the amount of retained austenite decreases, and the desired TS×EL cannot be obtained. Hence, the average cooling rate in step C is preferably set to 10° C./sec or less, and is preferably 7° C./sec or less, more preferably 3° C./sec or less. Alternatively, the average cooling rate in step C may be 0° C./sec, that is, the steel sheet may be held at a constant temperature. Within the above temperature range, the cooling rate may be changed, or cooling and holding at a constant temperature may be combined. In the retention of step C, the temperature of the steel sheet may be raised within the temperature of 300° C. or more and 500° C. or less because of heat generation due to bainite transformation.

When the retention time t3 is less than 10 seconds, sufficient bainite transformation does not occur, as a result, sufficient carbon concentrated regions are not formed, the amount of retained austenite decreases, and the desired TS×EL cannot be obtained. Hence, the retention time t3 at 300° C. or more and 500° C. or less is preferably set to 10 seconds or more, and is preferably 20 seconds or more, more preferably 30 seconds or more.

However, when the retention time t3 is 300 seconds or more, the bainite transformation in step C progresses excessively. In this case, the carbon concentrated portion becomes too large, and retained austenite and MA in the microstructure of the annealed steel sheet become coarse. As a result, the hole expansion ratio λ decreases, and the desired TS×λ cannot be obtained. Hence, the retention time t3 at 300° C. or more and 500° C. or less is preferably set to less than 300 seconds, and is preferably 200 seconds or less, more preferably 100 seconds or less.

[Step D: Step of Performing Cooling From Retention End Temperature T3b to Cooling Stop Temperature T4 in Temperature Range of 100° C. Or More and 300° C. Or Less at Average Cooling Rate of 10° C./Sec Or More]

In step D in FIG. 1, the steel sheet retained in step C is cooled from the retention end temperature T3b (corresponding to the cooling start temperature in step D) of 300° C. or more to the cooling stop temperature T4 in a temperature range of 100° C. or more and 300° C. or less at an average cooling rate CR3 ([6] in FIG. 1) of 10° C./sec or more. This makes it possible to subject a part of untransformed austenite to martensitic transformation and micronize untransformed austenite that is not transformed into martensite. As a result, fine retained austenite and MA are obtained. The formed martensite becomes tempered martensite through the step to be described later, and thus the yield ratio YR and collision safety can be enhanced.

When the average cooling rate CR3 is less than 10° C./sec, the carbon concentrated region expands more than necessary during cooling, MA becomes coarse, and thus TS×λ decreases. Hence, the average cooling rate CR3 is preferably set to 10° C./sec or more, and is preferably 15° C./sec or more, more preferably 20° C./sec or more. The upper limit of the average cooling rate CR3 is not particularly limited, but may be, for example, 100° C./sec or less.

When the cooling stop temperature T4 ([7] in FIG. 1) exceeds 300° C., sufficient martensitic transformation does not occur, MA in the microstructure of the annealed steel sheet become coarse, and the desired TS×λ cannot be obtained. At the same time, a sufficient amount of tempered martensite cannot be introduced into the microstructure of the annealed steel sheet, and the yield ratio YR also decreases. Hence, the cooling stop temperature T4 is preferably set to 300° C. or less, and is preferably 280° C. or less, more preferably 260° C. or less.

When the cooling stop temperature T4 is less than 100° C., the martensitic transformation proceeds excessively, and the desired amount of retained austenite cannot be secured in the microstructure of the annealed steel sheet. As a result, the total elongation EL decreases and the desired TS×EL cannot be obtained. Hence, the cooling stop temperature T4 is preferably set to 100° C. or more, and is preferably 120° C. or more, more preferably 140° C. or more.

In this step D, after the cooling is stopped, as illustrated in [7] of FIG. 1, the temperature may be held at the cooling stop temperature T4, but it is preferable to further perform the step of reheating to be described later without performing holding at the cooling stop temperature T4. When holding is performed at the cooling stop temperature T4, it is preferable that the holding time t4 is set to 1 second or more and 600 seconds or less. The properties are hardly affected when the holding time t4 at the cooling stop temperature T4 is long, but the productivity decreases when the holding time t4 exceeds 600 seconds.

[Step F: step of performing heating from cooling stop temperature T4 to reheating temperature T5 in temperature range of 300° C. or more and 500° C. or less and performing holding for time t5 of 350 seconds or more and 1800 seconds or less in temperature range of reheating tempera true T5]

In step E in FIG. 1, the steel sheet cooled in step D is heated to a reheating temperature T5 that satisfies the following requirement at 300° C. or more and 500° C. or less and held for a time (holding time t5) of 350 seconds or more and 1800 seconds or less in the temperature range of the reheating temperature T5 ([9] in FIG. 1). This reheating temperature T5 needs to satisfy the requirement that the difference between the reheating temperature T5 and the average temperature [(T3a+T3b)/2] of the cooling stop temperature T3a in step B (corresponding to the retention start temperature in step C) and the retention end temperature T3b is 50° C. or less.

The heating rate HR2 up to the reheating temperature T5 ([8] in FIG. 1) is not particularly limited, and examples thereof include 1° C./sec or more and 50° C./sec or less.

When the reheating temperature T5 is less than 300° C., martensite cannot be sufficiently tempered, the skewness of IQ exceeds −0.3, and the desired TS×EL cannot be obtained. Hence, the reheating temperature T5 is preferably set to 300° C. or more, and is preferably 320° C. or more, more preferably 340° C. or more.

When the reheating temperature T5 exceeds 500° C., carbon precipitates as cementite, and a sufficient amount of retained austenite cannot be secured. As a result, the total elongation EL decreases and the desired TS×EL cannot be obtained. Hence, the reheating temperature T5 is preferably set to 500° C. or less, and is preferably 480° C. or less, more preferably 460° C. or less.

When the reheating temperature T5 is more than 50° C. higher than the average temperature of the cooling stop temperature T3a and the retention end temperature T3b, the bainite precipitated in this step E becomes excessively soft and the skewness of IQ is less than −1.2. As a result, the desired collision safety cannot be obtained.

When the reheating temperature T5 is more than 50° C. lower than the average temperature of the cooling stop temperature T3a and the retention end temperature T3b, the difference in hardness between the bainite precipitated in step C and the bainite and tempered martensite precipitated in step E becomes large and the hole expansion ratio λ decreases. For this reason, the difference between the reheating temperature T5 and the average temperature of the cooling stop temperature T3a and the retention end temperature T3b is preferably 50° C. or less, preferably 40° C. or less, more preferably 30° C. or less.

When the holding time t5 ([9] in FIG. 1) after reheating in this step E is less than 350 seconds, the desired tempered state of hard microstructures such as martensite cannot be obtained and the skewness of IQ of the crystal grains having a bcc structure and a bct structure is less than −1.2. As a result, the desired collision safety cannot be obtained. Hence, the holding time t5 after reheating is preferably set to 350 seconds or more, and is preferably 380 seconds or more, more preferably 400 seconds or more. When the retention time t5 after reheating is more than 1800 seconds, the mechanical properties are hardly affected but a decrease in productivity is caused. Hence, the holding time t5 is preferably set to 1800 seconds or less, and is preferably 1200 seconds or less, more preferably 600 seconds or less.

After holding is performed at the reheating temperature T5, cooling is performed, but the average cooling rate CR4 ([10] in FIG. 1) at this time is not particularly limited, and for example, the average cooling rate CR4 is 1° C./sec or more and 50° C./sec or less.

In the high-strength steel sheet of the present embodiment, the steel sheet may be subjected to plating such as electroplating and deposition plating, and may be further subjected to alloying after plating. The steel sheet may be subjected to surface treatments such as formation of an organic film, film lamination, organic salt treatment, inorganic salt treatment, and non-chromium treatment.

When hot dip galvanizing is performed on the steel sheet as plating, for example, the temperature of the steel sheet is raised or lowered to not less than the temperature of the galvanizing bath −40° C. and to not more than the temperature of the galvanizing bath +50° C. and the steel sheet is allowed to pass through the galvanizing bath. By this hot dip galvanizing, a steel sheet having a hot dip galvanized layer on the surface, namely, a hot dip galvanized steel sheet can be obtained.

When the alloying is performed after hot dip galvanizing, for example, the hot dip galvanized steel sheet is heated to a temperature of 460° C. or more and 600° C. or less. When the heating temperature is less than 460° C., alloying may insufficiently proceed. When the heating temperature exceeds 600° C., alloying may excessively proceed and corrosion resistance may deteriorate. By alloying, a steel sheet having an alloyed hot dip galvanized layer on the surface, namely, an alloyed hot dip galvanized steel sheet can be obtained.

It should be noted that the above embodiments are merely specific examples for carrying out the present invention, and the technical scope of the present invention should not be construed in a limited manner by these. In other words, the present invention can be implemented in various forms without departing from the technical idea or its main features.

The present specification discloses various aspects of a technique as described above, but the main techniques are summarized below.

A high-strength steel sheet according to an aspect of the present invention contains
each of
C: 0.10% to 0.35%;
Si+Al: 0.5% to 3.0%;
Mn: 1.0% to 3.0%;
P: more than 0% and 0.05% or less;
S: more than 0% and 0.01% or less in terms of mass percentage; and
iron and unavoidable impurities as remainder,
wherein the high-strength steel sheet has a metallographic microstructure having ferrite fraction: 0% to 10%, MA fraction: 0% to 30%, hard phase other than ferrite and MA: 70% to 100% in terms of area proportion and
retained austenite fraction: 5% to 30% in terms of volume proportion, and
a skewness of IQ as analyzed by an EBSD method is −1.2 to −0.3 when the skewness is expressed by the following Formula (1) in a case where crystal grains having a bcc structure and a bct structure are regarded as an aggregation of regions having an area of 0.05 μm².

[Math. 4]

$$\frac{n}{(n-1)(n-2)}\sum\left(\frac{x_i - x_{ave}}{s}\right)^3 \qquad \text{Formula (1)}$$

Each variable in Formula (1) denotes the following.
n: Total number of regions having a bcc structure and a bct structure and an area of 0.05 μm²
s: Standard deviation of IQ in a region having an area of 0.05 μm²
$x_i$: IQ of a region i having an area of 0.05 μm²
$x_{ave}$: Average IQ of regions having a bcc structure and a bct structure and an area of 0.05 μm²

By such a configuration, it is possible to provide a high-strength steel sheet exhibiting both excellent collision safety and excellent moldability.

As a preferred embodiment of the present invention, it is also effective to further contain (a) at least one selected from the group consisting of Ti: more than 0% and 0.2% or less, Nb: more than 0% and 0.2% or less, and V: more than 0% and 0.5% or less, (b) at least one selected from the group consisting of Ni: more than 0% and 2% or less, Cr: more than 0% and 2% or less, and Mo: more than 0% and 0.5% or less, (c) B: more than 0% and 0.005% or less, (d) at least one selected from the group consisting of Mg: more than 0% and 0.04% or less, REM: more than 0% and 0.04% or less, and Ca: more than 0% and 0.04% or less, and the like in the high-strength steel sheet, if necessary. The properties of the high-strength steel sheet are further improved depending on the kinds of elements contained.

Another preferred embodiment of the present invention also includes a high-strength steel sheet having a plating layer on the surface of the steel sheet.

As another aspect of the present invention, a method for manufacturing a high-strength steel sheet is also included, and this manufacturing method includes, in this order:

after heating a steel material having the above chemical composition, then subjecting the steel material to hot rolling, cooling and coiling the steel material after the hot rolling is completed, and then subjecting the steel material to pickling and cold rolling, a step of heating the steel material to a temperature T1 of an $Ac_3$ transformation point of the steel or more and 950° C. or less and holding the steel material for a time t1 of 5 seconds or more and 1800 seconds or less in this temperature range for austenitization;

a step of performing cooling from a rapid cooling start temperature T2 of 700° C. or more to a cooling stop temperature T3a in a temperature range of 300° C. or more and 500° C. or less at an average cooling rate CR2 of 10° C./sec or more;

a step of performing retention for a time t3 of 10 seconds or more and less than 300 seconds at an average cooling rate of 10° C./sec or less in a temperature range of 300° C. or more and 500° C. or less;

a step of performing cooling from a retention end temperature T3b of 300° C. or more to a cooling stop temperature T4 in a temperature range of 100° C. or more and 300° C. or less at an average cooling rate CR3 of 10° C./sec or more; and a step of performing heating from the cooling stop temperature T4 to a reheating temperature T5 that satisfies the following requirement in a temperature range of 300° C. or more and 500° C. or less and performing holding for a time t5 of 350 seconds or more and 1800 seconds or less in the temperature range of the reheating temperature T5, a difference between the reheating temperature T5 and an average temperature of the cooling stop temperature T3a and the retention end temperature T3b being 50° C. or less.

By such a configuration, it is possible to manufacture a high-strength steel sheet exhibiting both excellent collision safety and excellent moldability as described above.

When a high-strength steel sheet having a plating layer on the surface of the steel sheet as described above is manufactured, it is only required that the manufacturing method further includes a step of applying a plating layer to the surface of the steel sheet.

Hereinafter, the present invention will be described more specifically with reference to Examples, but the present invention is not limited to the following Examples, and of course, it is also possible to carry out the present invention by appropriately adding changes within a range that is compatible with the above-mentioned gist and the below-mentioned gist, and all of them are included in the technical scope of the present invention.

EXAMPLES

Cast steels (steel types A to E) having the chemical compositions (remainder: iron and unavoidable impurities other than P and S) presented in Table 1 below were manufactured by vacuum melting, and the cast materials were then hot rolled to have a sheet thickness of 30 mm, and then further hot rolled. The $Ac_3$ transformation point of each steel type presented in Table 1 below are the values calculated by the following Formula (2) created with reference to Formula VII-20 described on page 273 of "The Physical Metallurgy of Steels: 1985, William C. Leslie". In Table 1, the column of "-" means that it is not added or it is less than the measurement limit.

$Ac_3$ transformation point (° C.)=910−203×[C]$^{1/2}$−15.2×[Ni]+44.7×[Si]+104×[V]+31.5×[Mo]−30×[Mn]−11×[Cr]+700×[P]+400×[Al]+400×[Ti]   Formula (2)

In Formula (2), [C], [Ni], [Si], [V], [Mo], [Mn], [Cr], [P], [Al] and [Ti] mean the mass percentages of C, Ni, Si, V, Mo, Mn, Cr, P, Al and Ti, respectively, and the elements not included are calculated as "0% by mass".

TABLE 1

| Steel type | Chemical composition (% by mass) | | | | | | | | $Ac_3$ transformation point (° C.) |
|---|---|---|---|---|---|---|---|---|---|
| | C | Si | Mn | P | S | Al | Ti | B | |
| A | 0.194 | 1.97 | 2.67 | 0.006 | 0.0008 | 0.040 | 0.017 | 0.0001 | 856 |
| B | 0.218 | 1.11 | 2.25 | 0.010 | 0.0012 | 0.045 | 0.031 | 0.0023 | 835 |
| C | 0.293 | 1.54 | 2.04 | 0.007 | 0.0010 | 0.039 | — | — | 828 |
| D | 0.250 | 2.06 | 2.06 | 0.008 | 0.0010 | 0.037 | — | 0.0001 | 859 |
| E | 0.204 | 1.80 | 2.14 | 0.006 | 0.0008 | 0.048 | — | — | 858 |

In the hot rolling, the sample material was heated to 1250° C. and then rolled to have a sheet thickness of 2.6 mm by multistage rolling. At this time, the end temperature of hot rolling was set to 920° C. Thereafter, the sample material was cooled to 600° C. at an average cooling rate of 30° C./sec, inserted into a furnace heated to 600° C., held for 30 minutes, and then cooled in a furnace to obtain a hot rolled steel sheet. The hot rolled steel sheet was pickled to remove scale on the surface, and then cold rolled to obtain a cold rolled steel sheet having a thickness of 1.4 mm as an original sheet.

The obtained original sheet was subjected to the heat treatment presented in Table 2 (steps A to C illustrated in FIG. 1) and. Table 3 (steps D to E illustrated in FIG. 1) below to obtain a sample. In Test No. 1 of Tables 2 and 3, after reheating and holding in step E, heat treatment simulating hot dip galvannealing consisting of holding at 460° C., which corresponded to immersion in a plating bath, and holding at 500° C., which corresponded to heating an alloying furnace, was performed. In Tables 2 and 3, the average cooling rates CR1, CR2, and CR3 are expressed as a minus to distinguish them from the heating rates.

TABLE 2

| | | Step A | | | Step B | | | | Step C | | | |
|---|---|---|---|---|---|---|---|---|---|---|---|---|
| | | | | | | Rapid cooling | Cooling | | Retention | Retention | | |
| Test No. | Steel type | Average heating rate HR1 (° C./sec) | Heating temperature T1 (° C.) | Holding time t1 (seconds) | Average cooling rate CR1 (° C./sec) | start temperature T2 (° C.) | stop temperature T3a (° C.) | Average cooling rate CR2 (° C./sec) | start temperature (corresponding to T3a) ° C. | end temperature T3b (° C.) | Retention time t3 (seconds) | Average cooling rate (° C./sec) |
| 1 | A | 5 | 930 | 126 | −2 | 910 | 400 | −12 | 400 | 400 | 71 | 0 |
| 2 | B | 4 | 860 | 161 | −2 | 840 | 400 | −50 | 400 | 400 | 80 | 0 |
| 3 | C | 13 | 930 | 295 | −2 | 910 | 400 | −50 | 400 | 400 | 45 | 0 |
| 4 | D | 50 | 930 | 180 | −2 | 910 | 400 | −50 | 400 | 400 | 50 | 0 |
| 5 | E | 15 | 930 | 246 | −2 | 910 | 425 | −50 | 425 | 425 | 37 | 0 |
| 6 | E | 3 | 800 | 144 | −2 | 780 | 190 | −50 | None | None | None | None |
| 7 | E | 4 | 890 | 144 | −2 | 870 | 190 | −50 | None | None | None | None |

TABLE 3

| | | Step D | | | | Step E | | | | | |
|---|---|---|---|---|---|---|---|---|---|---|---|
| | | Cooling start temperature T3b (° C.) | Cooling stop temperature T4 (° C.) | Average cooling rate CR3 (° C./sec) | Holding time t4 (seconds) | Reheating rate HR2 (° C./sec) | Reheating temperature T5 (° C.) | (T3a − T3b)/2 − T5 (° C.) | Holding time t5 (seconds) | Average cooling rate CR4 (° C./sec) | Remark |
| 1 | A | 400 | 200 | −13 | 7 | 30 | 400 | 0 | 445 | 10 | With alloying hot dip galvanizing simulation |
| 2 | B | 400 | 250 | −31 | 5 | 30 | 400 | 0 | 384 | 10 | — |
| 3 | C | 400 | 250 | −12 | 2 | 30 | 370 | 30 | 441 | 10 | — |
| 4 | D | 400 | 200 | −50 | 50 | 50 | 400 | 0 | 450 | 10 | — |
| 5 | E | 425 | 200 | −21 | 2 | 30 | 400 | 25 | 335 | 10 | — |
| 6 | E | 780 | 190 | −50 | None | 30 | 420 | — | 402 | 10 | — |
| 7 | E | 870 | 190 | −50 | None | 30 | 420 | — | 402 | 10 | — |

The metallographic microstructure and skewness of IQ of the obtained sample at the sheet thickness/4 position were determined by the above-mentioned methods. The results are presented in Table 4 below.

Using the obtained sample, a tensile test, a hole expansion test, and a VDA bending test were performed by each of the following methods, and the mechanical properties of the steel sheet were measured. The results are presented in Table 5 below.

[Tensile Test]

JIS No. 5 tensile test pieces were collected from the sample so that the direction perpendicular to the rolling direction of the steel sheet was the longitudinal direction, and subjected to measurement of the yield strength YP, tensile strength TS and total elongation EL in conformity to the method prescribed in JIS Z 2241: 2011.

[Hole Expansion Test]

The sample was subjected to the hole expansion test prescribed by JFS T1001 to measure the hole expansion ratio λ.

[VDA Bending Test]

Based on the VDA standard (VDA238-100) prescribed by the German Association of the Automotive Industry, the bending test was performed under the following conditions, and the displacement at the maximum load measured in the bending test was converted into an angle based on the VDA standard to determine the bending angle. The load at a bending angle of 10° was then evaluated.

(Measurement Conditions)

Test method: Roll supporting, punch pushing

Roll diameter: ϕ30 mm

Punch shape: Tip R=0.4 mm

Distance between rolls: 2.9 mm

Punch pushing speed: 20 mm/min

Test piece dimensions: 60 mm×60 mm

Bending direction: Perpendicular to rolling direction

Testing machine: SHIMADZU AUTOGRAPH (maximum load: 20 kN)

TABLE 4

| Test No. | Steel type | Ferrite fraction (% by area) | MA fraction (% by area) | Remaining hard phase (% by area) | Retained austenite fraction (% by volume) | Skewness of IQ |
|---|---|---|---|---|---|---|
| 1 | A | 1 | 9 | 90 | 7.5 | −0.875 |
| 2 | B | 0 | 11 | 89 | 9.1 | −0.883 |
| 3 | C | 0 | 16 | 84 | 12.8 | −0.669 |
| 4 | D | 2 | 13 | 85 | 10.5 | −0.620 |
| 5 | E | 0 | 13 | 87 | 12.9 | −1.665 |
| 6 | E | 49 | 14 | 37 | 14.6 | −1.409 |
| 7 | E | 3 | 7 | 90 | 6.2 | −0.164 |

TABLE 5

Mechanical properties of steel sheet

| Test No. | Steel type | Yield strength YS (MPa) | Tensile strength TS (MPa) | Yield ratio YR (−) | Total elongation EL (%) | TS × EL (MPa · %) | Hole expansion ratio λ (%) | TS × λ (MPa · %) | Load at bending angle of 10° in VDA bending test/sheet thickness (kN/mm) | Remark |
|---|---|---|---|---|---|---|---|---|---|---|
| 1 | A | 1007 | 1189 | 0.85 | 15.0 | 17835 | 88.0 | 104632 | 3.29 | Example |
| 2 | B | 1030 | 1169 | 0.88 | 14.4 | 16834 | 52.7 | 61606 | 3.37 | Example |
| 3 | C | 1028 | 1218 | 0.84 | 14.7 | 17905 | 51.2 | 62362 | 3.44 | Example |
| 4 | D | 1207 | 1374 | 0.88 | 12.6 | 17312 | 49.8 | 68425 | 3.56 | Example |
| 5 | E | 830 | 1045 | 0.79 | 16.8 | 17556 | 36.7 | 38352 | 2.56 | Comparative Example |
| 6 | E | 633 | 1043 | 0.61 | 23.2 | 24198 | 23.3 | 24302 | 2.08 | Comparative Example |
| 7 | E | 1136 | 1282 | 0.89 | 9.4 | 12051 | 53.4 | 68459 | 3.04 | Comparative Example |

From these results, it can be considered as follows. First, Test Nos. 1 to 4 all satisfy the chemical composition prescribed in the high-strength steel sheet of the present embodiment (steel types A to D in Table 1), are manufactured under the manufacturing conditions prescribed in the manufacturing method of the present embodiment to obtain the desired steel microstructure, and thus exhibit excellent collision safety (load at a bending angle of 10° in the VDA bending test/sheet thickness) in addition to a high tensile strength TS, a high yield ratio YR and high moldability (TS×EL, TS×λ).

On the other hand, Test Nos. 5 to 7 do not satisfy the manufacturing conditions prescribed in the manufacturing method of the present embodiment, thus the desired steel microstructure has not been obtained, and as a result, any one of the mechanical properties is inferior.

Specifically, Test No. 5 is an example in which the holding time t5 in step E is shorter than the desired condition, and the skewness of IQ is lower than the desired value. As a result, the desired mechanical properties regarding TS×λ and collision safety have not been obtained.

Test No. 6 is an example in which the heating temperature in step A is low (less than the $Ac_3$ transformation point) and step C is not included. By not including step C, soft bainite has not precipitated but a large amount of ferrite (a microstructure having high IQ) has precipitated in step A, the average value of IQ has increased, and the skewness of IQ has decreased. As a result, the amount of ferrite and the skewness of IQ have deviated from the desired ranges, thus the yield ratio YR, TS×λ and the collision safety have decreased, and the desired mechanical properties have not been obtained.

Test No. 7 does not include step C, thus it is expected that soft bainite has not precipitated but the amount of harder martensite (a microstructure having low IQ) has increased in step D. As a result, contrary to Test No. 6, the skewness of IQ is higher than the desired value and TS×EL has decreased.

This application is based on Japanese Patent Application No. 2019-168392 filed on Sep. 17, 2019, the contents of which are included in the present application.

In order to express the present invention, the present invention has been described above appropriately and sufficiently through the embodiments with reference to specific examples and the like. However, it should be recognized by those skilled in the art that changes and/or improvements of the above-described embodiments can be readily made. Accordingly, changes or improvements made by those skilled in the art shall be construed as being included in the scope of the claims unless otherwise the changes or improvements are at the level which departs from the scope of the appended claims.

INDUSTRIAL APPLICABILITY

The present invention has broad industrial applicability in the technical field related to high-strength steel sheets and methods for manufacturing the same.

The invention claimed is:
1. A high-strength steel sheet, comprising:
0.10% to 0.35% of C;
0.5% to 3.0% of Si+Al;
1.0% to 3.0% of Mn;
more than 0% and 0.05% or less of P; and more than 0% and 0.01% or less of S, in terms of mass percentage, wherein the high-strength steel sheet has a metallographic microstructure having a ferrite fraction of 0% to 10%, a Fresh-Martensite/Retained-Austenite (MA) fraction in a range of from 0% to 30%, a hard phase other than ferrite and MA in a range of from 70% to 100% in terms of area proportion, and a retained austenite fraction in a range of from 5% to 30% in terms of volume proportion, and wherein a skewness of image quality (IQ) as analyzed by an Electron Back Scatter Diffraction (EBSD) method is in a range of from −1.2 to −0.3, when the skewness is expressed by Formula (1) in a case where crystal grains having a bcc structure and a bct structure are regarded as an aggregation of regions having an area of 0.05 μm²:

$$\frac{n}{(n-1)(n-2)}\sum\left(\frac{x_i - x_{ave}}{s}\right)^3, \quad (1)$$

wherein, in Formula (1), n is total number of regions having a bcc structure and a bct structure and an area of 0.05 μm², s is standard deviation of the IQ in a region having an area of 0.05 μm², $x_i$ is the IQ of a region i having an area of 0.05 μm², and $x_{ave}$ is an average IQ of regions having a bcc structure and a bct structure and an area of 0.05 μm².

2. The high-strength steel sheet of claim 1, further comprising:

Ti at a concentration of more than 0% and 0.2% or less;
Nb at a concentration of more than 0% and 0.2% or less; and/or
V at a concentration of more than 0% and 0.5% or less.

3. The high-strength steel sheet of claim 1, further comprising:

Ni at a concentration of more than 0% and 2% or less;
Cr at a concentration of more than 0% and 2% or less; and/or
Mo at a concentration of more than 0% and 0.5% or less.

4. The high-strength steel sheet of claim 1, further comprising:

B at a concentration of more than 0% and 0.005% or less.

5. The high-strength steel sheet of claim 1, further comprising:

Mg at a concentration of more than 0% and 0.04% or less;
REM at a concentration of more than 0% and 0.04% or less; and/or
Ca at a concentration of more than 0% and 0.04% or less.

6. The high-strength steel sheet of claim 1, further comprising:

a plating layer on a surface of the steel sheet.

7. A method for manufacturing the high-strength steel sheet of claim 1, the method comprising, in this order:

after heating a steel material comprising, in mass percentage, the C in a range of from 0.10 to 0.35%; Si+Al in a range of from 0.5 to 3.0%; Mn in a range of from 1.0 to 3.0%; P in a range of from more than 0 to 0.05%; and S in a range of from more than 0 to 0.01%, then subjecting the steel material to hot rolling, cooling, and coiling the steel material after the hot rolling is completed, and then subjecting the steel material to pickling and cold rolling, heating the steel material to a temperature T1 of an $Ac_3$ transformation point of the steel or more and 950° C. or less and holding the steel material for a time t1 of 5 seconds or more and 1800 seconds or less in this temperature range for austenitization;

cooling from a rapid cooling start temperature T2 of 700° C. or more to a cooling stop temperature T3a in a temperature range of 300° C. or more and 500° C. or less at an average cooling rate CR2 of 10° C./sec or more;

performing retention for a time t3 of 10 seconds or more and less than 300 seconds at an average cooling rate of 10° C./sec or less in a temperature range of 300° C. or more and 500° C. or less;

cooling from a retention end temperature T3b of 300° C. or more to a cooling stop temperature T4 in a temperature range of 100° C. or more and 300° C. or less at an average cooling rate CR3 of 10° C./sec or more; and heating from the cooling stop temperature T4 to a reheating temperature T5 that satisfies the following requirement in a temperature range of 300° C. or more and 500° C. or less and performing holding for a time t5 of 350 seconds or more and 1800 seconds or less in the temperature range of the reheating temperature T5, wherein a difference between the reheating temperature T5 and an average temperature of the cooling stop temperature T3a and the retention end temperature T3b being 50° C. or less.

8. The method of claim 7, further comprising:

forming a plating layer to a surface of the steel sheet.

9. The high-strength steel sheet of claim 1, further comprising:

Ti at a concentration of more than 0% and 0.2% or less.

10. The high-strength steel sheet of claim 1, further comprising:

Nb at a concentration of more than 0% and 0.2% or less.

11. The high-strength steel sheet of claim 1, further comprising:

V at a concentration of more than 0% and 0.5% or less.

12. The high-strength steel sheet of claim 1, further comprising:

Ni at a concentration of more than 0% and 2% or less.

13. The high-strength steel sheet of claim 1, further comprising:

Cr at a concentration of more than 0% and 2% or less.

14. The high-strength steel sheet of claim 1, further comprising:

Mo at a concentration of more than 0% and 0.5% or less.

15. The high-strength steel sheet of claim 1, further comprising:

Ma at a concentration of more than 0% and 0.04% or less.

16. The high-strength steel sheet of claim 1, further comprising:

REM at a concentration of more than 0% and 0.04% or less.

17. The high-strength steel sheet of claim 1, further comprising:

Ca at a concentration of more than 0% and 0.04% or less.

18. The high-strength steel sheet of claim 1, comprising the Al in a range of more than 0.1 to 3.0 wt. %.

19. The high-strength steel sheet of claim 1, comprising the Al in a range of more than 0.6 to 3.0 wt. %.

20. The high-strength steel sheet of claim 1, comprising the Al in more than 0.1 wt. %, and
wherein the Si and Al are present in a range of from 0.5 to 2.5 wt. %.

* * * * *